US008153183B2

(12) United States Patent
Skubic et al.

(10) Patent No.: US 8,153,183 B2
(45) Date of Patent: Apr. 10, 2012

(54) ADJUSTABLE PLATFORM ASSEMBLY FOR DIGITAL MANUFACTURING SYSTEM

(75) Inventors: Robert L. Skubic, Chanhassen, MN (US); James W. Comb, Hamel, MN (US)

(73) Assignee: Stratasys, Inc., Eden Prairie, MN (US)

( * ) Notice: Subject to any disclaimer, the term of this patent is extended or adjusted under 35 U.S.C. 154(b) by 776 days.

(21) Appl. No.: 12/255,330

(22) Filed: Oct. 21, 2008

(65) Prior Publication Data

US 2010/0100222 A1 Apr. 22, 2010

(51) Int. Cl.
*G06F 19/00* (2011.01)
*B05C 13/00* (2006.01)
*B05D 1/02* (2006.01)

(52) U.S. Cl. ............ 427/8; 118/300; 118/500; 118/708; 118/729; 264/40.1; 264/40.7; 264/112; 264/113; 264/125; 264/308; 264/309; 264/497; 419/66; 427/424; 427/427.3; 700/110; 700/119

(58) Field of Classification Search .................. 118/300, 118/321, 323, 500, 503, 708, 729; 264/40.1, 264/40.5, 109, 112, 113, 125, 171.1, 171.11, 264/171.18, 211.21, 211.24, 212, 299, 308, 264/309; 148/522; 419/30, 38, 41, 46, 47, 419/60, 66, 67; 427/8, 9, 421.1, 424, 427.2, 427/427.3, 427.4; 700/110, 117, 118, 119, 700/120

See application file for complete search history.

(56) References Cited

U.S. PATENT DOCUMENTS

| 5,121,329 | A | 6/1992 | Crump ........................ 364/468 |
| 5,340,433 | A | 8/1994 | Crump ........................ 156/578 |
| 5,491,643 | A | 2/1996 | Batchelder .................... 364/512 |
| 5,939,008 | A | 8/1999 | Comb et al. .................. 264/308 |
| 5,968,561 | A | 10/1999 | Batchelder et al. ........... 425/375 |
| 6,367,791 | B1 | 4/2002 | Calderon et al. ............. 269/291 |
| 6,685,866 | B2 | 2/2004 | Swanson et al. ............. 264/308 |
| 6,722,872 | B1 | 4/2004 | Swanson et al. ............. 425/225 |
| 6,776,602 | B2 | 8/2004 | Swanson et al. ........... 425/376.1 |
| D514,913 | S | 2/2006 | Dunn et al. ..................... D8/71 |
| 7,127,309 | B2 | 10/2006 | Dunn et al. ..................... 700/98 |
| 2004/0104515 | A1* | 6/2004 | Swanson et al. ............. 264/497 |
| 2007/0228592 | A1 | 10/2007 | Dunn et al. .................. 264/40.4 |
| 2010/0090374 | A1* | 4/2010 | Dietrich et al. .............. 264/497 |

FOREIGN PATENT DOCUMENTS

JP 05318607 A * 12/1993

* cited by examiner

*Primary Examiner* — Michael Cleveland
*Assistant Examiner* — Alexander Weddle
(74) *Attorney, Agent, or Firm* — Brian R. Morrison; Westman, Champlin & Kelly, P.A.

(57) ABSTRACT

A platform assembly for use in a digital manufacturing system, where the platform assembly comprises a deformable platform having a surface configured to operably receive a deposited material from a deposition head, and at least one mechanism configured to adjust at least a portion of the first surface to compensate for at least one vertical deviation from at least one horizontal axis that the deposition head is directed to move in.

19 Claims, 8 Drawing Sheets

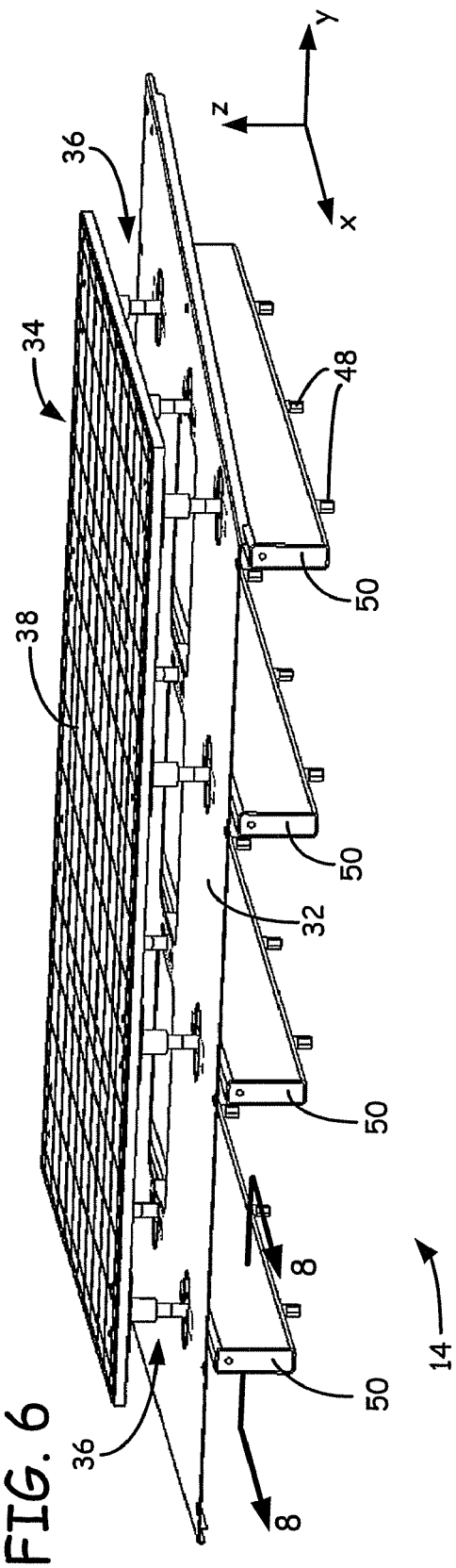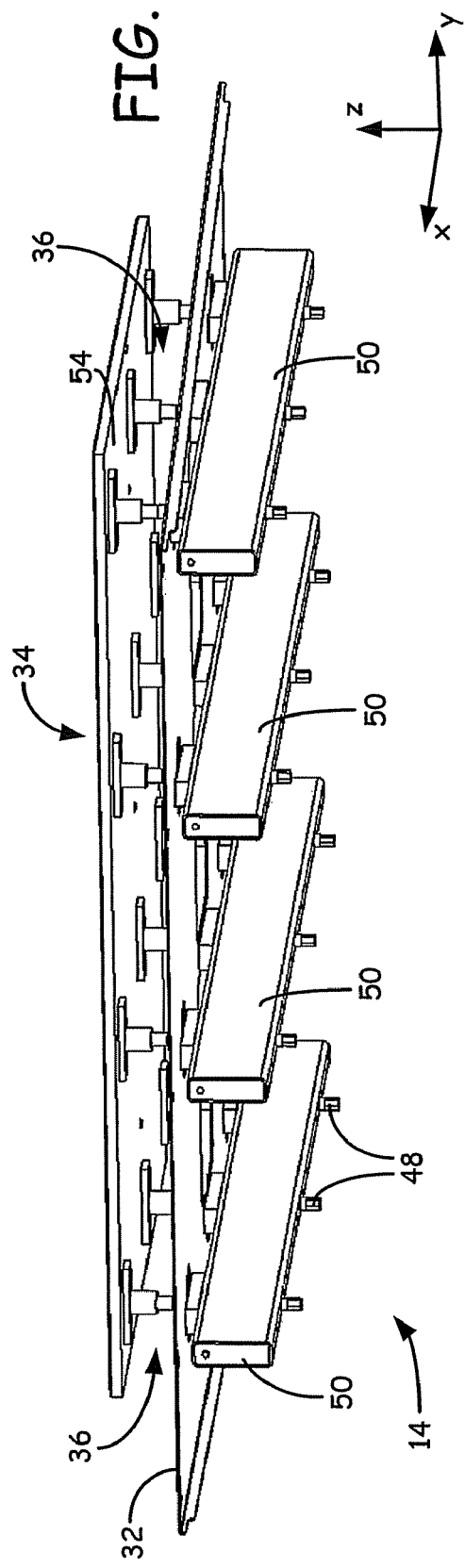

ADJUSTABLE PLATFORM ASSEMBLY FOR DIGITAL MANUFACTURING SYSTEM

CROSS-REFERENCE TO RELATED APPLICATION(S)

Reference is hereby made to co-pending U.S. patent application Ser. No. 12/255,289, entitled "Adjustable Head Mount For Digital Manufacturing System", filed on even date.

BACKGROUND

The present disclosure relates to digital manufacturing systems for building three-dimensional (3D) models. In particular, the present disclosure relates to platform assemblies for use with digital manufacturing systems, such as deposition-based digital manufacturing systems.

Digital manufacturing systems are used to build 3D models from digital representations of the 3D models (e.g., STL format files) using one or more layer-based additive techniques. Examples of commercially available layer-based additive techniques include fused deposition modeling, ink jetting, selective laser sintering, electron-beam melting, and stereolithographic processes. For each of these techniques, the digital representation of the 3D model is initially sliced into multiple horizontal layers. For each sliced layer, a build path is then generated, which provides instructions for the particular digital manufacturing system to form the given layer. For deposition-based systems (e.g., fused deposition modeling and ink jetting), the build path defines the pattern for depositing roads of modeling material from a moveable deposition head to form the given layer.

For example, in a fused deposition modeling system, modeling material is extruded from a moveable extrusion head, and is deposited as a sequence of roads on a platform in a horizontal x-y plane based on the build path. The extruded modeling material fuses to previously deposited modeling material, and solidifies upon a drop in temperature. The position of the extrusion head relative to the platform is then incremented along a vertical z-axis, and the process is then repeated to form a 3D model resembling the digital representation.

Movement of the deposition head in the x-y plane, and movement of the deposited layers along the z-axis on the underlying platform are desirably controlled such that each layer of material is uniformly deposited. This typically requires the deposition head to remain at a constant and uniform distance above the platform during a deposition process. Thus, ideally, the deposition head remains in the same x-y plane over its operational range of motion, and the underlying platform exhibits a truly planar surface. This allows the deposition head to remain at the same height along the z-axis relative to the platform over its operational range of motion. However, due to manufacturing limitations, the gantry that supports the deposition head may not necessarily move the deposition head in a perfect x-y plane, and the platform may not necessarily exhibit a truly planar surface. These limitations may also increase as the size of the platform and the area over which the gantry must cover increase, such as in layered deposition systems designed to produce large 3D models.

The varying heights between the deposition head and the underlying platform may have undesirable effects on the deposition patterns of the modeling and support materials, such as variations in layer thicknesses and variations in fine-feature resolution. This is particularly true for initially deposited layers of modeling and/or support materials that desirably bond to the underlying platform. Current corrective measures for reducing such variations involve reorienting the entire platform in an attempt to keep the minimize the variations. Such corrective measures, however, are inhibited as the size of the platform increases because the freedom to rotate the platform is significantly reduced. Additional corrective measures may involve depositing base layers (e.g., of support materials) prior to depositing the modeling material for the 3D model. While these techniques are suitable for mitigating the non-planar profiles, they may require additional time and costs for forming the base layers. As such, there is a need for systems and techniques for maintaining uniformity of the distances between depositions heads and underlying platform.

SUMMARY

An aspect of the disclosure is directed to a platform assembly for use in a digital manufacturing system having a deposition head that is directed to move substantially along at least one horizontal axis. The platform assembly includes a deformable platform having a first surface and a second surface, where the first surface is configured to operably receive a deposited material from the deposition head. The platform assembly also includes at least one mechanism operably secured to the second surface of the deformable platform, and configured to adjust at least a portion of the first surface to compensate for vertical deviation(s) from the at least one horizontal axis that the deposition head is directed to move in.

Another aspect of the disclosure is directed to a digital manufacturing system that includes a deposition head configured to deposit modeling material(s), and a controller configured to direct motion of the deposition head substantially along at least one horizontal axis, where an actual motion profile of the deposition head includes vertical deviation(s) from the at least one horizontal axis. The digital manufacturing system also includes a platform assembly configured to operably receive the deposited modeling material(s), where the platform assembly includes a surface that is adjustable to compensate for the vertical deviation(s) from the at least one horizontal axis.

A further aspect of the disclosure is directed to a method of operating a digital manufacturing system. The method includes determining an offset distance between a component of a deposition head of the digital manufacturing system and a surface of a platform assembly of the digital manufacturing system, and adjusting at least a portion of the surface of the platform assembly to compensate for at least one vertical deviation from the determined offset distance over an operational range of motion of the deposition head.

BRIEF DESCRIPTION OF THE DRAWINGS

FIG. 6 is a top perspective view of the adjustable platform assembly.

FIG. 7 is a bottom perspective view of the adjustable platform assembly.

DETAILED DESCRIPTION

Figure 1:
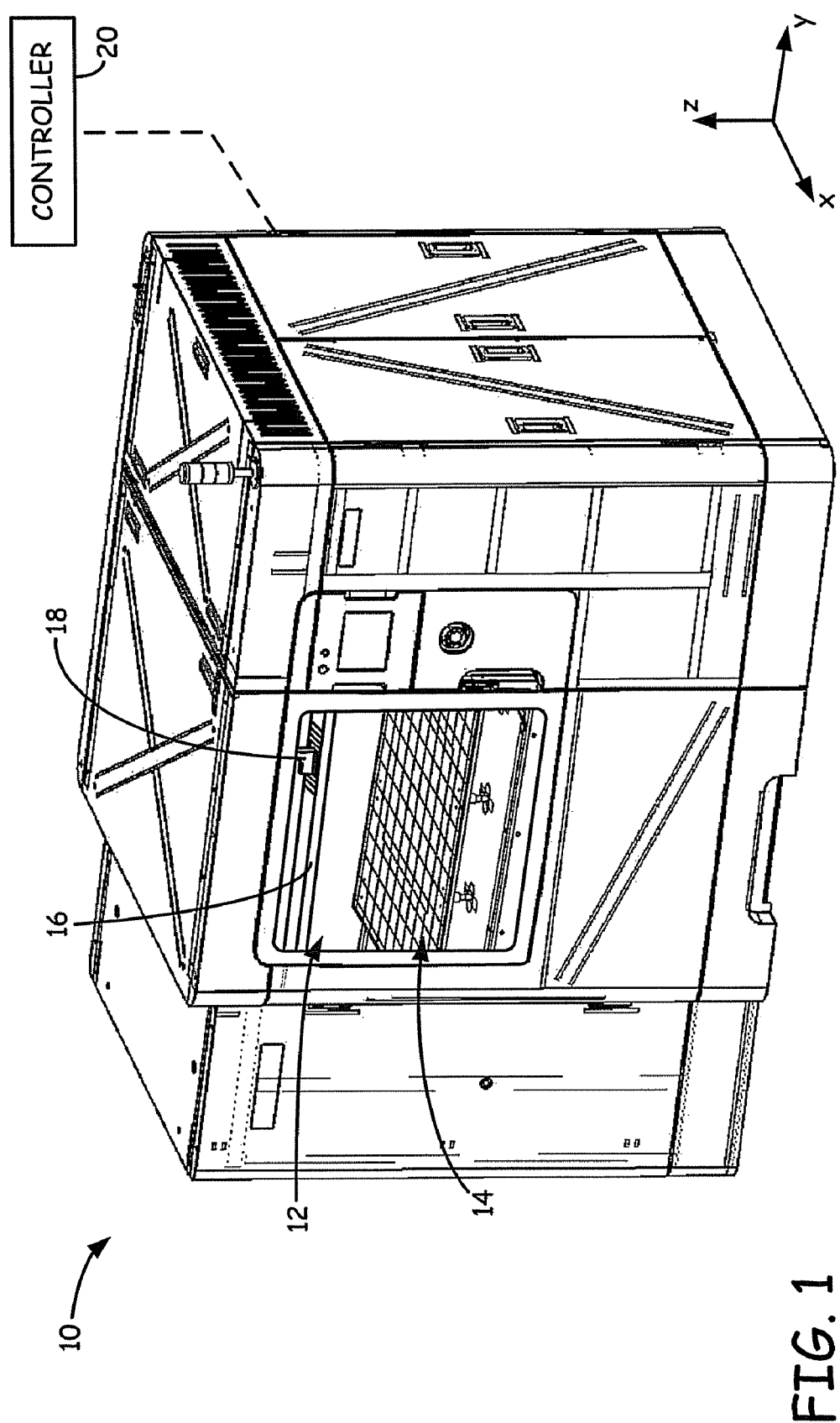
FIG. 1 is a perspective view of a digital manufacturing system that includes a deposition head and an adjustable platform assembly having a deformable platen.

As shown in FIG. 1, system 10 is a digital manufacturing system that includes build chamber 12, platform assembly 14, head gantry 16, and deposition head 18. System 10 is desirably a deposition-based system, such as an extrusion-based system and/or a jetting system, each of which may build 3D models and corresponding support structures using a layered-based additive technique. Examples of suitable extrusion-based systems for system 10 include fused deposition modeling systems developed by Stratasys, Inc., Eden Prairie, Minn., such as those disclosed in Comb et al., U.S. Pat. No. 5,939,008; Swanson et al., U.S. Pat. Nos. 6,722,872 and 6,776,602.

Build chamber 12 is an enclosed environment that contains platform assembly 14, head gantry 16, and deposition head 18 for building a 3D model (not shown) and a corresponding support structure (not shown). Platform assembly 14 is a receiving platform on which the 3D model and support structure are built, and desirably moves along a vertical z-axis based on signals provided from controller 20. Controller 20 is desirably one or more computer-operated controllers for operating system 10, and may be located internally or externally to system 10. Head gantry 16 is a guide rail system that is desirably configured to move deposition head 18 in a horizontal x-y plane within build chamber 12 based on signals provided from controller 20. The horizontal x-y plane is a plane defined by an x-axis and a y-axis, where the x-axis, the y-axis, and the z-axis are orthogonal to each other. In an alternative embodiment, platform assembly 14 may be configured to move along two axes within build chamber 12 (e.g., x-z plane or the y-z plane), and deposition head 18 may be configured to move along a single horizontal axis (e.g., the x-axis or the y-axis). Other similar arrangements may also be used such that one or both of platform assembly 14 and deposition head 18 are moveable relative to each other.

Deposition head 18 is supported by head gantry 16 for building the 3D model and support structure on platform assembly 14 in a layer-by-layer manner, also based on signals provided from controller 20. Suitable deposition heads for use with system 10 include a variety of different deposition-based components, such as extrusion heads, jetting heads, and combinations thereof. Examples of suitable extrusion heads for deposition head 18 include those disclosed in Leavitt et al., U.S. Patent Application Publication No. 2009/0035405. Furthermore, platform assembly 14 is suitable for use with a deposition head retained in a moveable mount as disclosed in Comb et al., U.S. Patent Application Publication No. 2010/0100224. Accordingly, deposition head 18 may deposit one or more modeling and support materials onto platform assembly 14 to build the 3D model and support structure. In alternative embodiments, system 10 may include a variety of different configurations for supplying one or more modeling materials and one or more support materials. Furthermore, system 10 may include a plurality of deposition heads 18 for depositing modeling and/or support materials.

In the embodiment shown in FIG. 1, during a build operation, head gantry 16 moves deposition head 18 around in the horizontal x-y plane within build chamber 12, and one or more feed mechanisms (not shown) are directed to intermittently feed the modeling and support materials through deposition head 18. The received modeling and support materials are then deposited onto platform assembly 14 to build the 3D model and support structure using a layer-based additive technique. After each layer is complete, platform assembly 14 may be lowered by an increment along the z-axis to allow successive layers to be formed on top of the previously deposited layers.

As discussed above, deposition head 18 desirably remains at a constant and uniform distance above platform assembly 14 during a deposition process. However, due to manufacturing limitations, deposition head 18 may not necessarily remain in the same horizontal x-y plane over its operational range of motion. For example, in embodiments in which head gantry 16 is supported by the housing of system 10 with conventional supports (not shown), the central regions of head gantry 16 may bow downward. While such vertical deviations are very small relative to the overall dimensions of system 10 (e.g., vertical deviations up to about 25 mils), such deviations may be on the same order of magnitude as the layer thicknesses used to build the 3D models and support structures. Thus, these deviations can potentially impact the accuracy of the deposition process. However, as discussed below, platform assembly 14 is configured to compensate for these vertical deviations from the horizontal x-y plane that deposition head 18 desirably moves in. This provides a substantially uniform distance between platform assembly 14 and deposition head 18 over the operational range of motion for deposition head 18.

The following discussion of platform assembly 14 and deposition head 18 focus on embodiments in which deposition head 18 is configured to move in a horizontal x-y plane, and platform assembly 14 is configured to compensate for the vertical deviations from the horizontal x-y plane. However, the present disclosure is also suitable for use with embodiments in which deposition head 18 moves only along a single horizontal axis (e.g., the x-axis or the y-axis). In these embodiments, platform assembly 14 is configured to compensate for the vertical deviations from the horizontal axis. Accordingly, platform assembly 14 is configured to compensate for vertical deviations from at least one horizontal axis, and more desirably compensates for vertical deviations from a horizontal plane.

Figure 2:
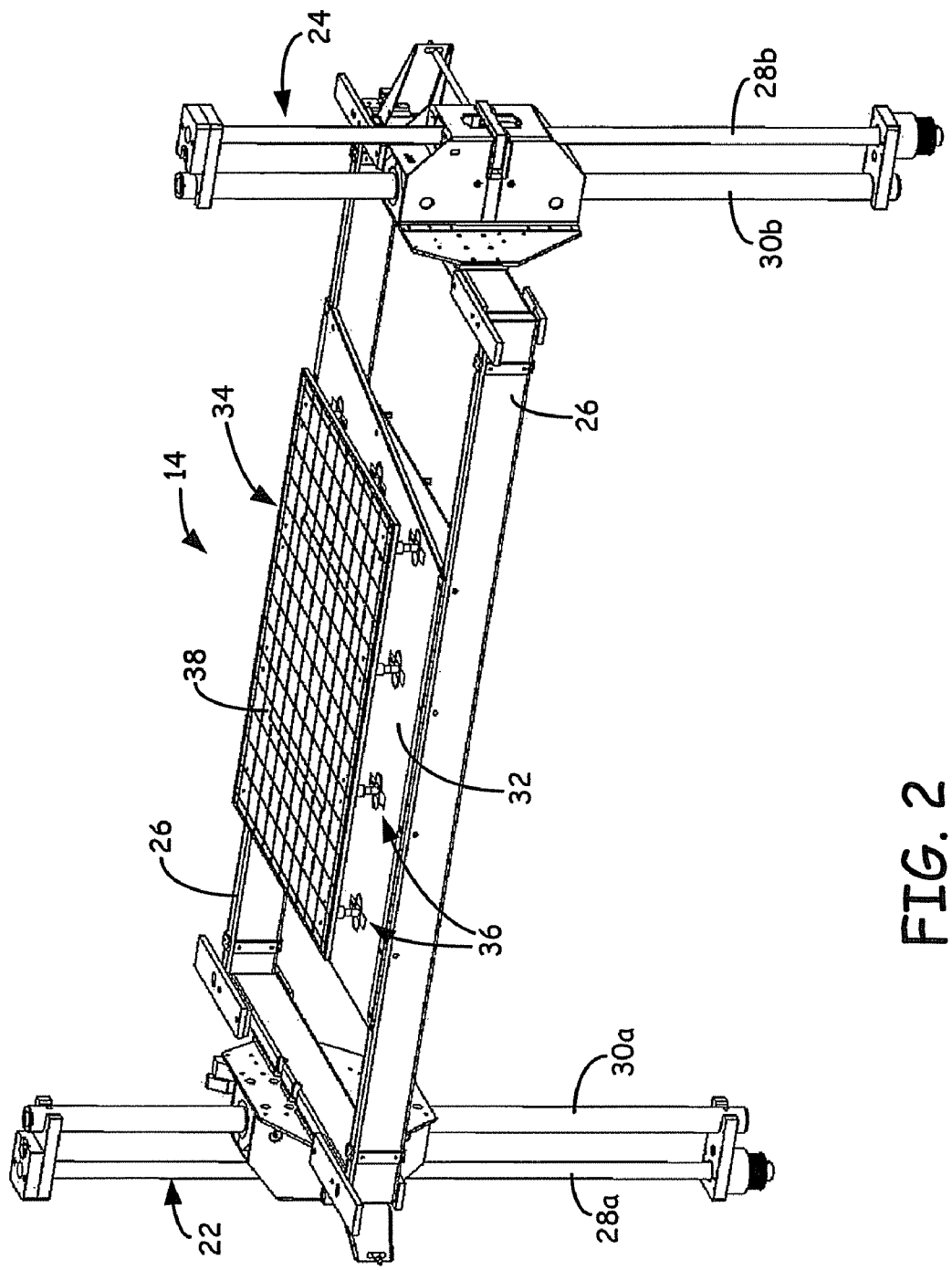
FIG. 2 is a top perspective view of the adjustable platform assembly and z-axis gantries.

As shown in FIG. 2, platform assembly 14 is supported by z-axis gantries 22 and 24, and frame structure 26. Z-axis gantries 22 and 24 respectively include screw gears 28a and 28b, and guide shafts 30a and 30b, where screw gears 28a and 28b are motor-operated screw gears that raise and lower frame structure 26 along the z-axis based on applied rotational power from a drive motor (not shown). Guide shafts 30a and 30b are linear shafts that restrict the movement of frame structure 26 to substantially linear directions along the z-axis. Examples of suitable designs and arrangements for z-axis gantries 22 and 24 include those disclosed in Comb et al., U.S. Pat. No. 5,939,008; Swanson et al., U.S. Pat. Nos. 6,722,872 and 6,776,602. Accordingly, the components of z-axis gantries 22 and 24, and frame structure 26 are desirably fabricated from one or more materials (e.g., steel) capable of withstanding the elevated temperature of build chamber 12. Frame structure 26 is secured to z-axis gantries 22 and 24, and supports platform assembly 14. Thus, upward and downward movement of frame structure 26 along the z-axis correspondingly moves platform assembly 14 in the same manner.

Platform assembly 14 includes base plate 32 and deformable platen 34, where deformable platen 34 is a platform supported above base plate 32 with a plurality of adjustable supports 36. Base plate 32 is a horizontal shear plate (e.g., a steel plate) secured to support frame 26, and desirably reduces movement in the horizontal x-y plane. In alternative embodiments, frame structure 26 and base plate 32 may be replaced with a variety of different arrangements that allows deformable platen 34 and adjustable supports 36 to be operably retained by z-axis gantries 22 and 24. For example, base plate 32 may be directly secured to z-axis gantries 22 and 24, thereby allowing frame structure 26 to be omitted.

Deformable platen 34 is desirably a deformable or otherwise flexible platform that includes top surface 38. In the shown embodiment, top surface 38 includes a grid of grooves for retaining a flexible substrate (not shown in FIG. 2) with a vacuum. Suitable materials for deformable platen 34 include materials capable of withstanding the elevated temperature of build chamber 12 (e.g., steel), and that also impart at least partial flexibility in deformable platen 34 to allow one or more portions to be adjusted in height along the z-axis. In alternative embodiments, deformable platen 34 may be replaced with a variety of different deformable platforms configured to operably receive deposited modeling and support materials. Suitable plate thicknesses along the z-axis for deformable platen 34 may vary depending on the composition of deformable platen 38 and on the topography of top surface 38. Examples of suitable average plate thicknesses along the z-axis for deformable platen 34 include thicknesses up to about 1.9 centimeters (about 0.75 inches), with particularly suitable average plate thicknesses ranging from about 0.65 centimeters (about 0.25 inches) to about 1.3 centimeters (about 0.50 inches). Furthermore, deformable platen 34 desirably exhibits a flexibility that is substantially greater than a flexibility exhibited by the combined support frame 26/base plate 32 (e.g., about 25-times greater).

Adjustable supports 36 are mechanisms that support deformable platen 34 at multiple locations, and are suitable for adjusting one or more portions of deformable platen 34 to compensate for the vertical deviations of the motion profile of deposition head 18 (shown in FIG. 1). As discussed below, this allows deformable platen 34 to maintain a surface profile that substantially matches the motion profile of deposition head 18 over at least a portion of the operational range of motion of deposition head 18, and more desirably over its entire operational range of motion. It is noted that, for current digital manufacturing systems, the actual range of motion of a deposition head typically extends laterally beyond the surface area of the underlying platform (e.g., for purging and cleaning of the deposition head). However, as used herein, the term "operational range of motion", with respect to a deposition head (e.g., deposition head 18) refers to a range of motion over the usable surface area of the underlying platform on which materials are deposited.

Figure 3:
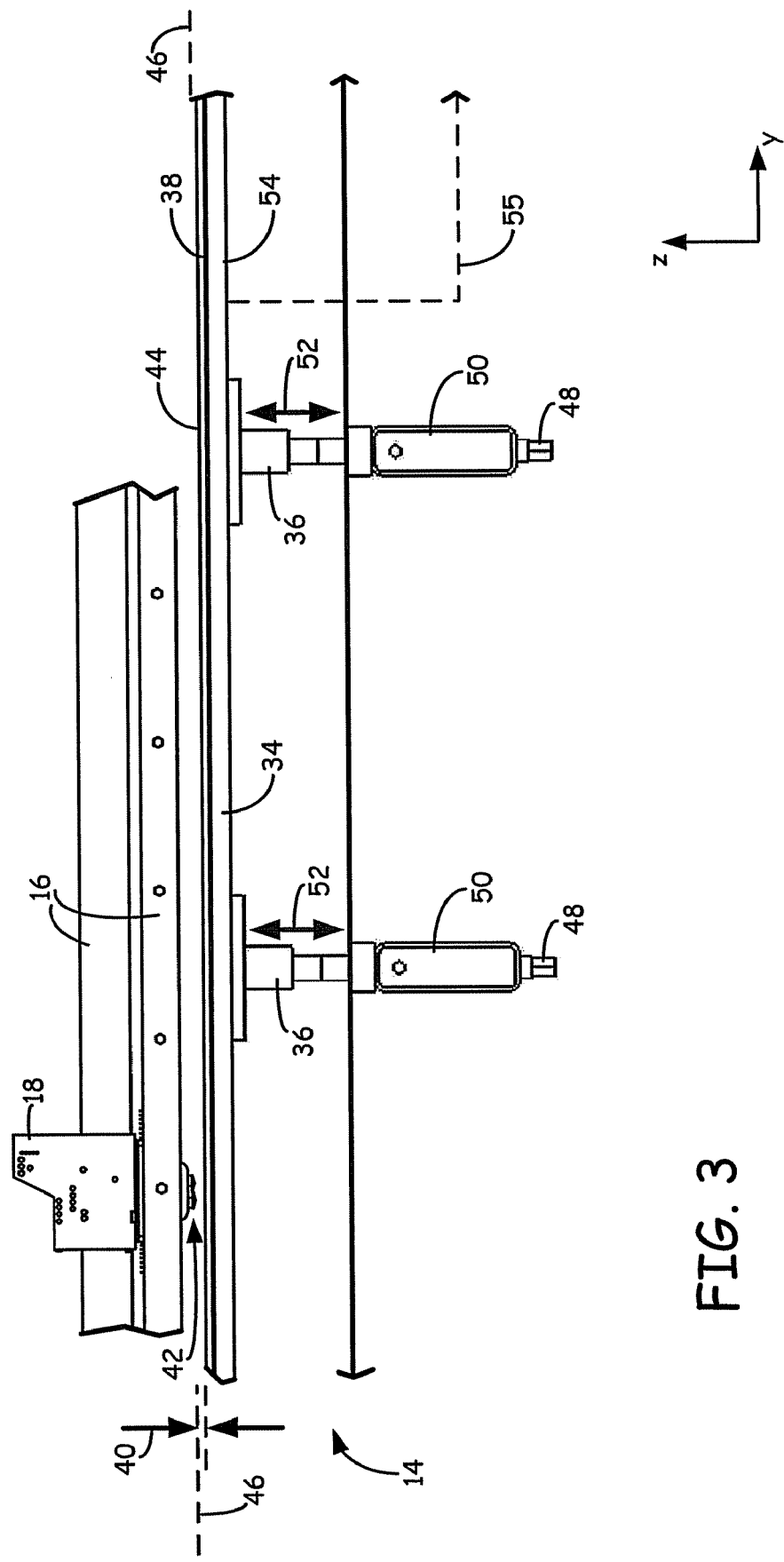
FIG. 3 is an expanded front view of the deposition head and the adjustable platform assembly.

FIG. 3 shows deposition head 18 disposed above platform assembly 14 by offset distance 40, where offset distance 40 is desirably a predetermined distance that one or both of platform assembly 14 and deposition head 18 are calibrated to before performing a build operation. In the shown embodiment, offset distance 40 is a distance between deposition tip 42 of deposition head 18 and substrate 44 disposed on deformable platen 34. For example, in an extrusion-based digital manufacturing system, a suitable average distance for offset distance 40 may range from about 0.025 centimeters (about 0.010 inches) to about 0.051 centimeters (about 0.020 inches). While described herein as an average distance between deposition tip 42 and substrate 44, offset distance 40 may alternatively be a predetermined distance between any components of platform assembly 14/z-axis gantries 22 and 24, and head gantry 16/deposition head 18, and may vary depending on the designs of platform assembly 14 and deposition head 18.

Accordingly, in an ideal situation, deposition tip 42 remains at offset distance 40 above substrate 44 at every location along substrate 44, thereby defining horizontal plane 46 (i.e., the perfect plane at which extrusion tip 42 desirably remains over the operational range of motion of deposition head 18). However, as discussed above, deposition head 18 may not necessarily remain aligned with horizontal plane 46 over its operational range of motion, and may exhibit upward and downward deviations from horizontal plane 46 over its operational range of motion.

The upward and downward deviations relative to horizontal plane 46 may be identified by measuring the offset distances between deposition tip 42 and substrate 44 over a plurality of locations across the surface areas of deformable platen 34 and/or substrate 44. For example, a user may take multiple laser gauge measurements to identify the offset distances between deposition tip 42 and substrate 44 (or between other similar components of platform assembly 14 and deposition head 18). Based on these measurements, the user may identify the upward and/or downward deviations from horizontal plane 46 over the operational range of motion of deposition head 18.

Alternatively, the upward and/or downward deviations from horizontal plane 46 may be identified through manufacturing specifications. For example, in embodiments in which head gantry 16 exhibits large dimensions (e.g., more than 4 or 5 feet along the x-axis and/or the y-axis), the central regions of head gantry 16 may bow downward due to the conventional support of head gantry 16 with the housing of system 10. The extent of the downward bowing may be identified and noted in the manufacturing specifications of system 10.

To compensate for these vertical deviations from horizontal plane 46, one or more adjustable supports 36 may be used to adjust the height of one or more portions of deformable platen 34, thereby allowing the given portion(s) of substrate 44 to be positioned at offset distance 40. As shown, adjustable supports 36 include actuators 48, which extend through cross beams 50. Cross beams 50 are support beams that are secured to frame structure 26 (shown in FIG. 2), and engage with adjustable supports 36. Cross beams 50 are suitable components for reinforcing base plate 32, thereby providing a substantially rigid structure to retain adjustable supports 36. As discussed below, a user may operate one or more actuators 48 to adjust the respective heights of adjustable supports 36 upward or downward along the z-axis (as represented by arrows 52). As further shown, adjustable supports 36 are secured to deformable platen 34 at bottom surface 54, which is the opposing surface from top surface 38. This allows the upward or downward adjustments to adjustable supports 36 to correspondingly move the respective portions of deformable platen 38 upward or downward. The flexibility of deformable platen 34 desirably allows each portion to be readily adjusted upward or downward without damaging the structural integrity of deformable platen 34. In alternative embodiments, adjustable supports 36 may be secured to intermediary components that are secured to deformable platen 34. Thus, adjustable supports 36 may be operably secured to bottom surface 54 of deformable platen 34 in a variety of manners.

Substrate 44 is desirably a flexible polymeric film (e.g., polycarbonate films, polypropylene films, and polyetherimide films) that conforms to the adjustments of deformable platen 34, and provides a suitable surface for building the 3D model and support structure. Prior to depositing the build and support materials, substrate 44 may be positioned on surface 38 of deformable platen 34. A vacuum may be drawn through one or more vacuum lines connected to deformable platen 34 (referred to as vacuum line 55), which draws the air through the grooves of surface 38 to distribute the vacuum along the entire area of surface 38. This vacuum retains substrate 44 against surface 38, thereby allowing substrate 44 to conform to the adjusted heights of deformable platen 34. In alternative embodiments, substrate 44 may be omitted, and deformable platen 34 may directly receive the deposited modeling and support materials. Thus, deformable platen 34 may operably receive the deposited modeling and support materials in a variety of manners (e.g., with or without a substrate).

In one embodiment, system 10 may include one or more vacuum lines that connect to multiple locations along deformable platen 34. This embodiment is beneficial for defining multiple build zones along surface 38. In this embodiment, smaller surface areas of deformable platen 34 may be used to build smaller 3D objects and/or support structures. Thus, a substrate 44 having a smaller surface area may be placed on top surface 38 at a desired location, thereby covering only a portion of top surface 38. The vacuum lines may then be selectively operated to only apply a vacuum at the location of substrate 44 (e.g., blocking off the remaining vacuum connections). Furthermore, the geometry of top surface 38 (i.e., the grid of zones) desirably defines enclosed build zones in which a vacuum may be drawn when substrate 44 is positioned on top surface 28 at the desired location. This reduces time and effort required by operators handling built 3D models, and further allows system 10 to be readily used to build 3D models having a variety of different sizes.

Figure 4A:
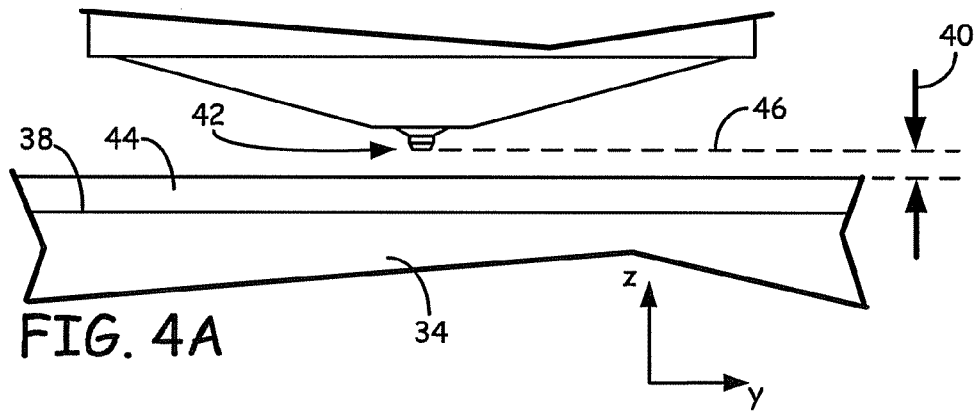
FIGS. 4A-4C are expanded front views of a deposition tip of the deposition head and the adjustable platform assembly, illustrating distance variations between the deposition head and the deformable platen.
Figure 4B:
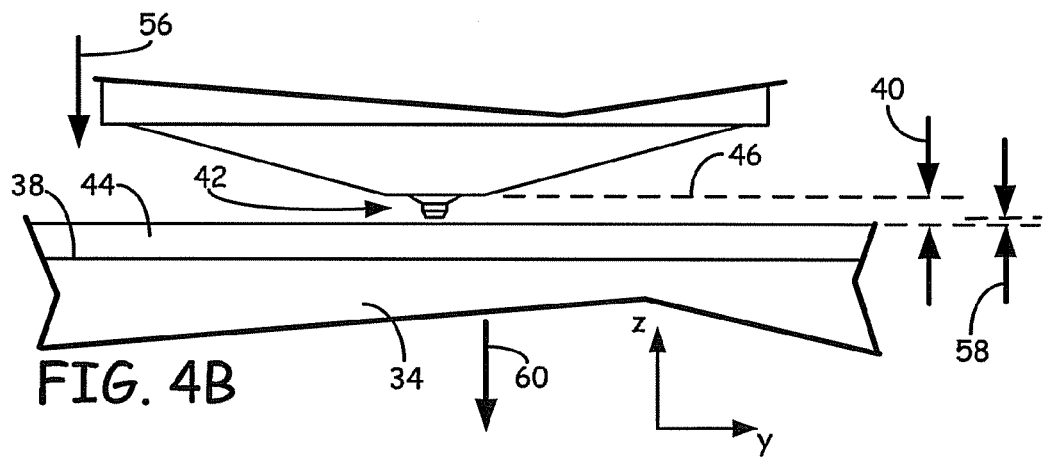
Figure 4C:
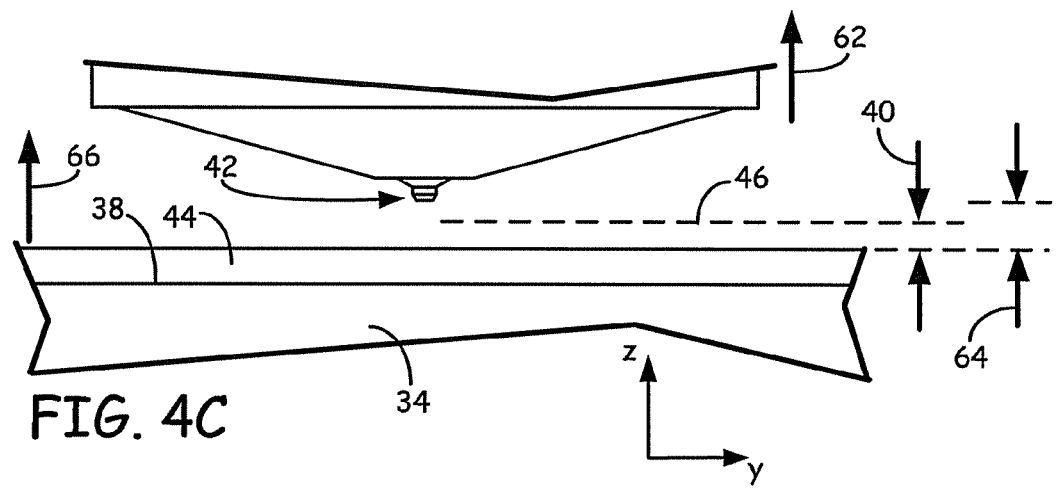

FIGS. 4A-4C illustrate the upward and downward deviations from horizontal plane 46 that may occur over the operational range of motion of deposition head 18. FIG. 4A shows an example in which deposition tip 42 is disposed above substrate 44 by the desired offset distance 40. At this distance, deposition head 18 is capable of depositing a build and/or support material in the desired and predicted manner. If deposition head 18 were capable of remaining aligned with horizontal plane 46 over its operational range of motion, deposition tip 42 would remain at offset distance 40 from substrate 44 at every location along substrate 44.

However, as shown in FIG. 4B, at locations where head gantry 16 bows downward, deposition tip 42 also deviates downward from the desired horizontal plane 46 by substantially the same distance (as represented by arrow 56). This results in deviated offset distance 58, which is less than the desired offset distance 40. Because deposition tip 42 is closer to substrate 44, the accuracy of the deposition process may be reduced, thereby potentially reducing the quality of the resulting 3D model and/or support structure. Accordingly, to compensate for this downward deviation, one or more adjustable supports 36 (shown in FIGS. 2 and 3) may be adjusted to lower the given portion of deformable platen 34 and substrate 44 at the location of the deviation (as represented by arrow 60). This repositions substrate 44 such that deposition tip 42 is separated from substrate 44 by offset distance 40 at the given location.

Additionally, as shown in FIG. 4C, at locations where head gantry 16 is flexed upward, deposition tip 42 deviates upward from the desired horizontal plane 46 by substantially the same distance (as represented by arrow 62). This results in deviated offset distance 64, which is greater than the desired offset distance 46. Because deposition tip 42 is further from substrate 44, the accuracy of the deposition process may also be reduced, thereby potentially reducing the quality of the resulting 3D model and/or support structure. Accordingly, to compensate for this upward deviation, one or more adjustable supports 36 (shown in FIGS. 2 and 3) may be adjusted to raise the given portion of deformable platen 34 and substrate 44 at the location of the deviation (as represented by arrow 66). This also repositions substrate 44 such that deposition tip 42 is separated from substrate 44 by offset distance 40 at the given location.

Figure 5:
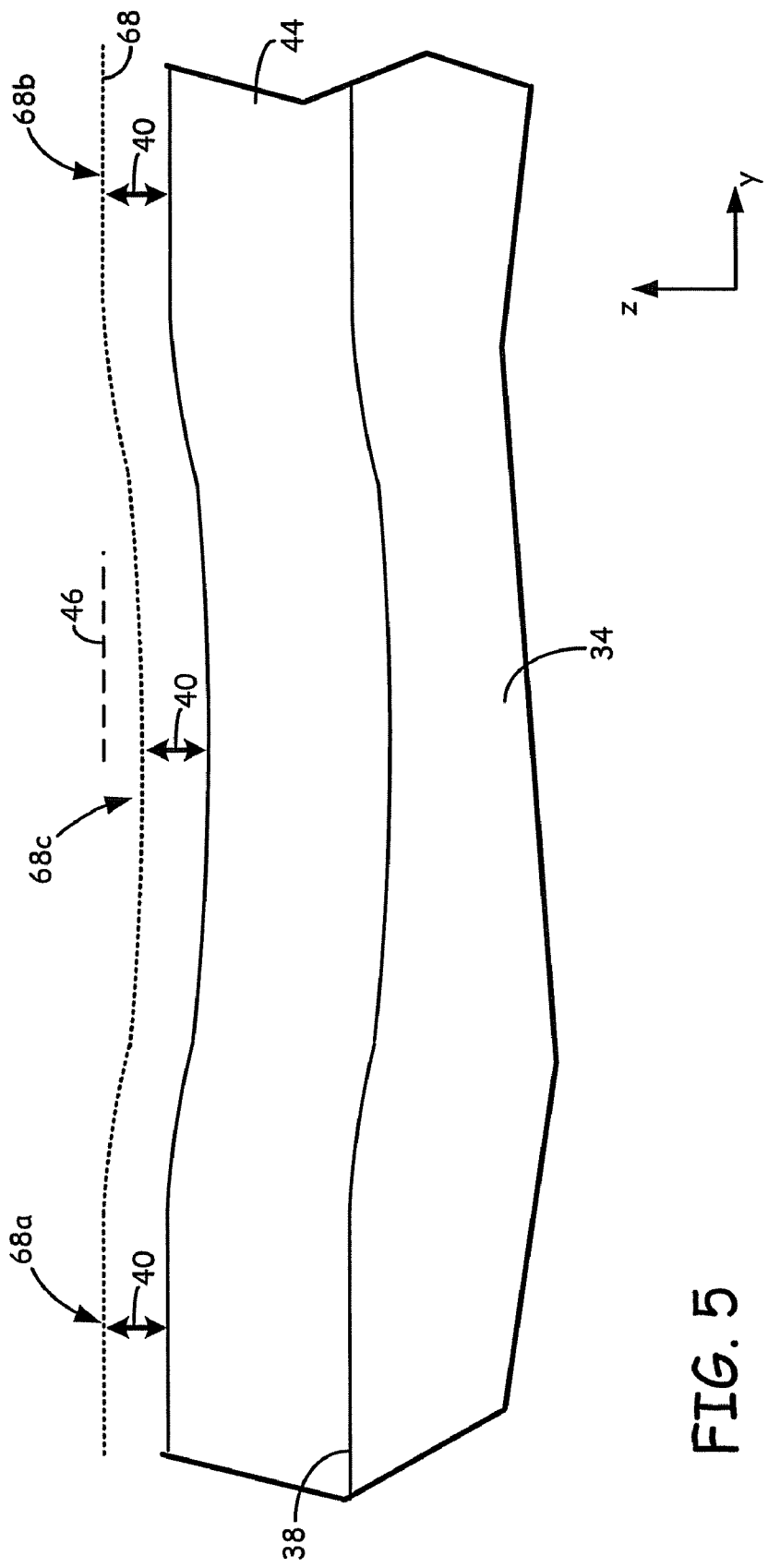
FIG. 5 is a schematic illustration of the deformable platen retaining a substrate, which illustrates the deformable platen being adjusted to compensate for vertical deviations of the motion profile of the deposition head.

FIG. 5 is a schematic illustration of deformable platen 34 and substrate 44 after being adjusted to conform with a downward deviation of deposition head 18 from the desired horizontal plane 46. As shown, profile 68 may be generated or otherwise identified from the deviation measurements, as discussed above. Profile 68 includes regions 68a and 68b, which are portions at which deposition tip 42 remains aligned with horizontal plane 46 (i.e., at offset distance 40). Thus, the distances between deposition tip 42 and substrate 44 at regions 68a and 68b do not deviate from offset distance 40, and deformable platen 34 does not require adjusting.

In comparison, at region 68c, profile 68 deviates downward along the z-axis from horizontal plane 46. As a result, deformable platen 36 may be lowered by substantially the same distance to compensate for the downward deviation. After the adjustment is complete, substrate 44 is positioned such that deposition tip 42 will desirably pass over substrate 44 at region 68c by offset distance 40. Accordingly, various portions of deformable platen 34 may be raised or lowered along the z-axis to substantially match profile 68. This allows deposition tip 42 to remain substantially at offset distance 40 from substrate 44 over the operational range of motion of deposition head 18.

As shown in FIGS. 6 and 7, platform assembly 14 may include one or more adjustable supports 36 for adjusting various regions of deformable platen 34. Suitable numbers of adjustable supports 36 may vary depending on the dimensions of build chamber 12 (shown in FIG. 1), the dimensions of deformable platen 34, the dimensions of head gantry 16 (shown in FIGS. 1 and 3), the deviation profile of deposition head 18, and combinations thereof. Examples of suitable numbers of adjustable supports 36 range from one to fifty, with particularly suitable numbers ranging from five to twenty five, and with even more particularly suitable numbers ranging from about ten to twenty.

As further shown, adjustable supports 36 are arranged in a two-dimensional array of multiple rows, which allows deformable platen 34 to be adjusted to compensate for vertical deviations from the horizontal x-axis and from the horizontal y-axis, thereby compensating for vertical deviations from the horizontal x-y plane. In alternative embodiments, adjustable supports 36 may arranged to compensate for vertical deviations from only a single horizontal axis (e.g., the x-axis or the y-axis). These embodiments are beneficial for reducing the number of adjustable supports 36 required, and are suitable for situations in which the deviations only exist along a single horizontal axis. Thus, as discussed above, adjustable supports 36 are suitable for compensating for vertical deviations from at least one horizontal axis, and more desirably for compensating for vertical deviations from a two-axis horizontal plane (e.g., the x-y plane).

In additional alternative embodiments, adjustable supports 36 may be replaced with alternative mechanisms capable of adjusting various portions of deformable platen 34 along the z-axis to compensate for vertical deviations of deposition head 18 from horizontal plane 46. For example, platform assembly 14 may include one or more alternative mechanically-actuating mechanisms (e.g., cam mechanisms), one or more electronic mechanisms, and combinations thereof. Furthermore, adjustable supports 36 may operate a process control loop to compensate for the vertical deviations in an automated manner. In these embodiments, deposition head 18 may include one or more sensors (e.g., an optical sensor) for detecting the distance between deposition head 18 and substrate 44 in real time. Moreover, actuators 48 may be operated with electronic systems in signal communication with the one or more sensors, thereby allowing adjustments to be made to deformable platen 34 in an automated manner when needed (e.g., prior to each build operation).

Figure 8A:
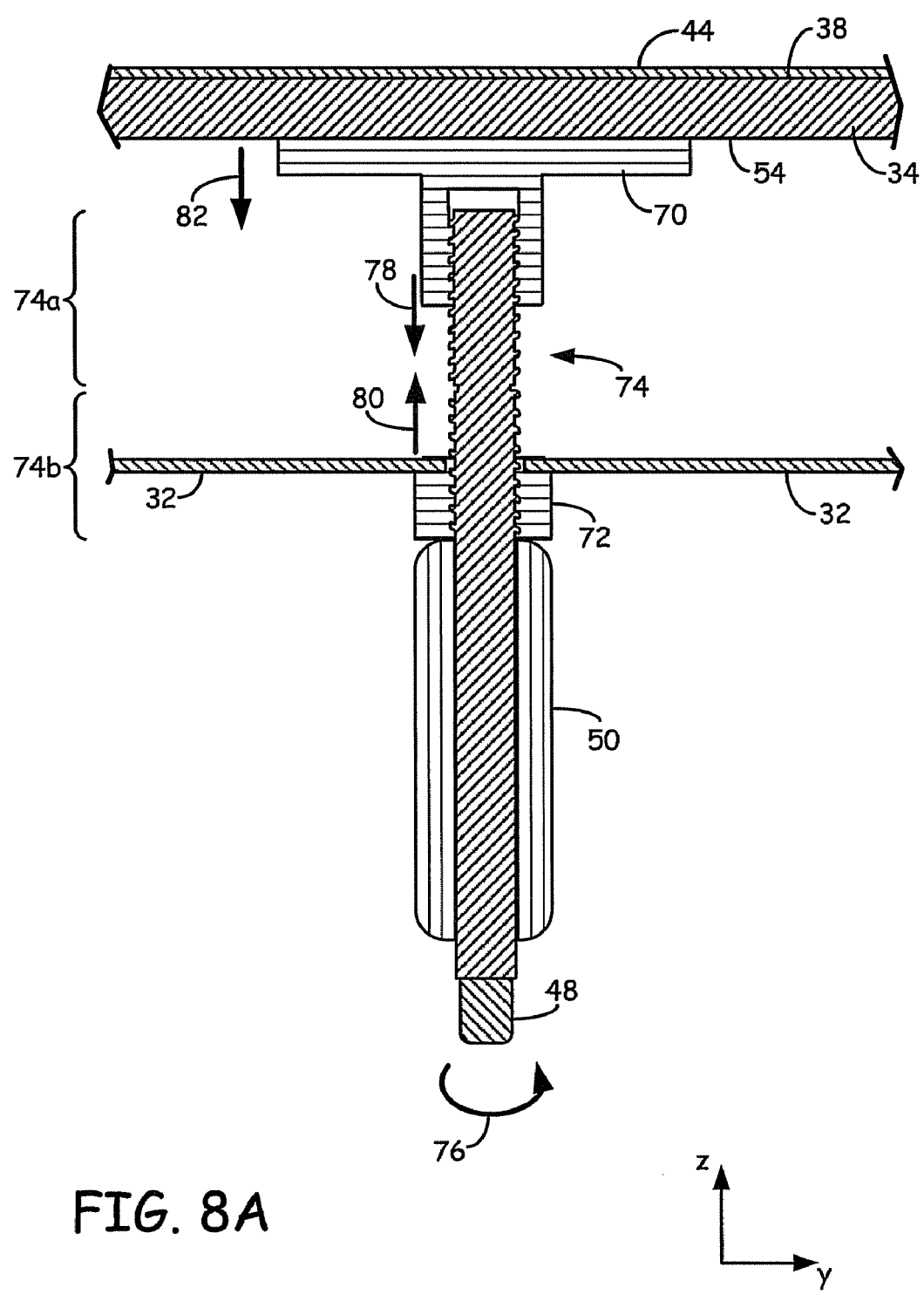
FIGS. 8A and 8B are expanded views of section 8-8 taken in FIG. 6, illustrating an adjustment support of the adjustable platform assembly.
Figure 8B:
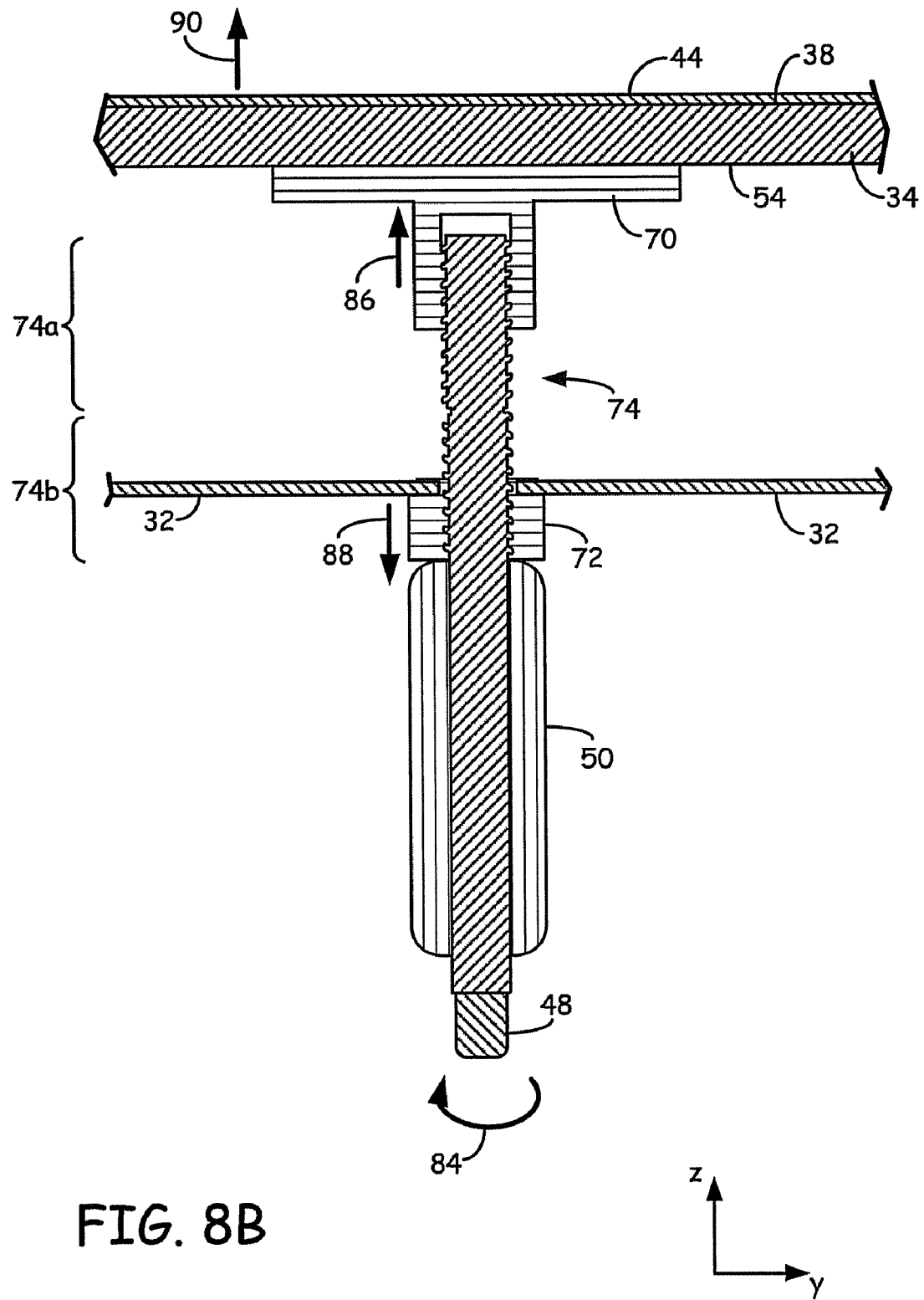

FIGS. 8A and 8B are sectional views of section 8-8 taken in FIG. 6, and illustrate the operation of one of adjustable supports 36 for adjusting the height of a portion of deformable platen 34. As shown in FIG. 8A, adjustable support 36 includes cap end 70, base end 72, and adjustment screw 74, where cap end 70 is operably secured to bottom surface 54 of deformable platen 34. Correspondingly, base end 72 of adjustable supports 36 is operably secured between base plate 32 and cross beam 50. Adjustment screw 74 extends into cap end 70, and through base plate 32, base end 72, and cross beam 50. Adjustment screw 74 includes top threaded portion 74a and bottom threaded portion 74b, which have reciprocating thread patterns (i.e., right-hand and left-hand thread patterns). Top threaded portion 74a is the portion of adjustment screw 74 that is threadedly engaged with cap end 70, and bottom threaded portion 74b is the portion that is threadedly engaged with base end 72.

The reciprocating thread patterns of top threaded portion 74a and bottom threaded portion 74b force cap end 70 and base end 72 in opposing directions based on the rotation of adjustment screw 74. Thus, when actuator 48 is rotated in a first rotational direction (represented by arrow 76), adjustment screw 74 rotates in the same rotational direction, thereby causing cap end 70 and base end 72 to move together (represented by arrows 78 and 80). Because cross beam 50 is secured to frame structure 26 (shown in FIG. 2), base end 72 and base plate 32 are effectively immobile relative to frame structure 26. Thus, the movement in the directions of arrows 78 and 80 causes cap end 70 and deformable platen 34 to move downward toward base plate 32, as represented by arrow 82. This adjusts the shown portion of deformable platen 32 downward to compensate for a downward deviation of deposition head 18 from the desired horizontal plane 46.

Alternatively, as shown in FIG. 8B, when actuator 48 is rotated in a second rotational direction that is opposite of the first rotational direction (represented by arrow 84), adjustment screw 74 rotates in the same rotational direction, thereby causing cap end 70 and base end 72 to move apart (represented by arrows 86 and 88). Because base end 72 and base plate 32 are effectively immobile relative to frame structure 26, the movement in the directions of arrows 86 and 88 causes cap end 70 and deformable platen 34 to move upward away from base plate 32, as represented by arrow 90. This adjusts the shown portion of deformable platen 32 upward to compensate for an upward deviation of deposition head 18 from the desired horizontal plane 46.

The adjustments with each adjustment support 36 of platform assembly 14 may be performed in the same manner to allow deformable platen 34 and substrate 44 to substantially match the deviation profile of deposition head 18 from the desired horizontal plane 46 for the operational range of motion of deposition head 18. This substantially preserves the accuracy of the deposition process for building 3D models and corresponding support structures.

Although the present disclosure has been described with reference to preferred embodiments, workers skilled in the art will recognize that changes may be made in form and detail without departing from the spirit and scope of the disclosure.

The invention claimed is:

1. A platform assembly for use in a digital manufacturing system having a deposition head that is directed to move substantially in a horizontal plane, the platform assembly comprising:
   a deformable platform having a first surface and a second surface, the first surface being configured to operably receive a deposited material from the deposition head;
   a base member disposed adjacent to the second surface of the deformable platform, the base member being configured to be supported by a gantry mechanism of the digital manufacturing system; and
   a plurality of adjustable supports each operably secured to the second surface of the deformable platform and engaged with the base member, wherein each of the plurality of adjustable supports is configured to adjust a vertical distance between portion of the deformable platform and a portion of the base member to compensate for at least one vertical deviation from the horizontal plane in which the deposition head is directed to move.

2. The platform assembly of claim 1, and further comprising at least one cross beam disposed adjacent to the base portion on an opposing side from the deformable platform, wherein the plurality of adjustable supports extend through the at least one cross beam.

3. The platform assembly of claim 1, wherein each of the plurality of adjustable supports comprises:
   a threaded screw having a first threaded portion and a second threaded portion;
   a base end component operably secured to the base member and threadedly engaged with the first threaded portion of the threaded screw; and
   a cap end component operably secured to the deformable platform and threadedly engaged with the second threaded portion of the threaded screw.

4. The platform assembly of claim 3, wherein the first threaded portion and the second threaded portion of the threaded screw comprise reciprocating thread patterns.

5. The platform assembly of claim 1, wherein the deformable platform comprises a vacuum platen, and wherein the platform assembly further comprises a flexible polymeric film configured to be positioned over at least a portion of the vacuum platen.

6. The platform assembly of claim 5, wherein the portion of the vacuum platen that the flexible polymeric film is configured to positioned over constitutes less than an entire surface area of the vacuum platen.

7. A digital manufacturing system comprising:
   a deposition head configured to deposit at least one material;
   a controller configured to direct motion of the deposition head substantially in a horizontal plane, wherein an actual motion profile of the deposition head comprises at least one vertical deviation from the horizontal plane; and
   a platform assembly configured to be moved along a vertical axis, the platform assembly comprising:
      a deformable platform configured to operably receive the at least one deposited material;
      a base member disposed below the deformable platform; and
      a plurality of adjustable supports each engaged with the deformable platform and the base member, and configured to adjust vertical distances between portions of the deformable platform and portions of the base member to compensate for the at least one vertical deviation of the actual motion profile from the horizontal plane.

8. The digital manufacturing system of claim 7, wherein the deposition head is selected from the group consisting of an extrusion head, a jetting head, and combinations thereof.

9. The digital manufacturing system of claim 7, wherein the plurality of adjustable supports are configured to adjust the vertical distances between the portions of the deformable platform and the portions of the base member to compensate for the at least one vertical deviation from the horizontal plane over an operational range of motion of the deposition head.

10. The digital manufacturing system of claim 9, wherein the each of the plurality of adjustable supports comprises:
  a threaded screw having a first threaded portion and a second threaded portion;
  a base end component operably secured to the base member and threadedly engaged with the first threaded portion of the threaded screw; and
  a cap end component operably secured to the deformable platform and threadedly engaged with the second threaded portion of the threaded screw.

11. The digital manufacturing system of claim 10, wherein the first threaded portion and the second threaded portion of the threaded screw comprise reciprocating thread patterns.

12. The digital manufacturing system of claim 10, wherein the platform assembly further comprises at least one cross beam disposed below the base portion, wherein the threaded screws of the adjustable supports extend through the at least one cross beam.

13. A method of operating a digital manufacturing system, the method comprising:
  providing a platform assembly of the digital manufacturing system, wherein the platform assembly comprises a base member supported by a gantry mechanism of the digital manufacturing system, and further comprising a deformable platform supported by the base member with a plurality of adjustable supports;
  moving a deposition head of the digital manufacturing system to multiple locations over the deformable platform within an operational range of motion of the deposition head;
  at each of the multiple locations, measuring a vertical offset distance between a deposition tip of the deposition head and a surface of the platform assembly;
  comparing the measured vertical offset distances to a predetermined offset distance to identify vertical deviations from the predetermined offset distance at one or more of the multiple locations; and
  actuating at least a portion of the adjustable supports to reduce the identified vertical deviations at the one or more locations such that the deposition tip of the deposition head is maintained substantially at the predetermined offset distance above the surface of the platform assembly over the operational range of motion of the deposition head.

14. The method of claim 13, wherein actuating the portion of the adjustable supports to reduce the identified vertical deviations at the one or more locations comprises rotating a threaded screw of each adjustable support of the actuated portion of the adjustable supports.

15. The method of claim 14, wherein the threaded screw of each adjustable support has reciprocating thread patterns.

16. The method of claim 14, wherein the platform assembly further comprises a flexible polymeric film disposed on the deformable platform, and wherein the surface of the platform assembly is a surface of the flexible polymeric film.

17. The method of claim 13, wherein actuating the portion of the adjustable supports to reduce the identified vertical deviations at the one or more locations comprises reducing distances between the deformable platform and the base member at the one or more locations.

18. The method of claim 17, wherein the identified vertical deviations are due to a downward bowing of a head gantry that supports the deposition head.

19. The method of claim 13, and further comprising:
  after manipulating the portion of the adjustable supports, moving the deposition head within the operational range of motion; and
  depositing a material from the deposition tip of the moving deposition head onto the platform assembly to build a three-dimensional model using a layer-based additive technique.

* * * * *